(No Model.)
F. D. JONES.
SUPPLEMENTAL SEAT FOR BICYCLES.
No. 460,072.   Patented Sept. 22, 1891.
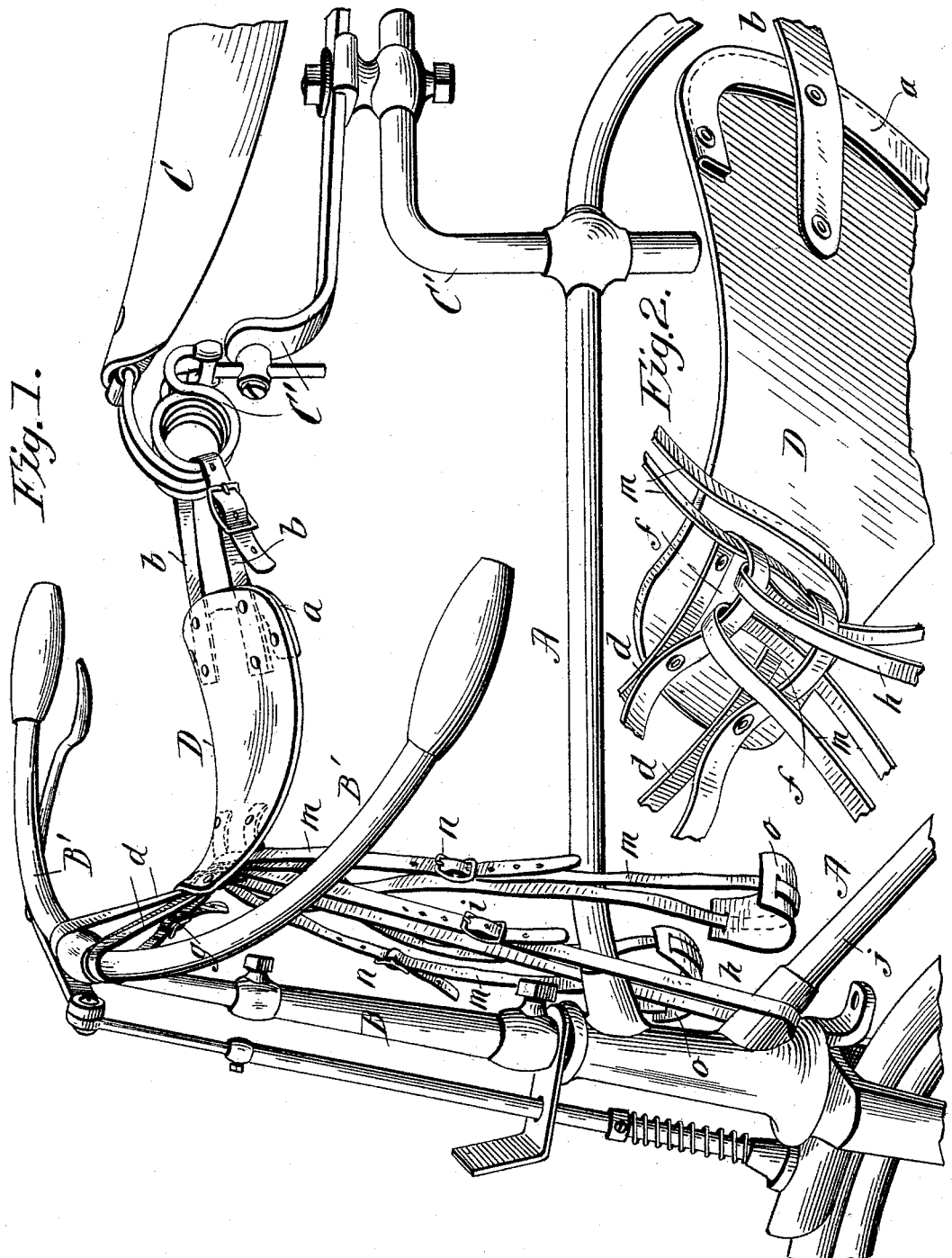

000
UNITED STATES PATENT OFFICE.

FRANK D. JONES, OF SPRINGFIELD, MASSACHUSETTS, ASSGINOR TO MARY D. GOETTING, OF SAME PLACE.

SUPPLEMENTAL SEAT FOR BICYCLES.

SPECIFICATION forming part of Letters Patent No. 460,072, dated September 22, 1891.

Application filed July 3, 1891. Serial No. 398,341. (No model.)

*To all whom it may concern:*

Be it known that I, FRANK D. JONES, a citizen of the United States, residing at Springfield, in the county of Hampden and State of Massachusetts, have invented new and useful Improvements in Supplemental Seats or Saddles for Bicycles, of which the following is a specification.

The present invention relates to improvements in supplemental seats or saddles for velocipedes, more particularly for Safety bicycles, by means of which a child or other person may also ride with the rider who impels the machine.

The objects of the invention are to provide supplemental seats or saddles which are entirely efficient, safe, and comfortable so far as the child or second person is concerned, and to provide a seat or saddle which when borne upon does not unduly tax or strain the machine, and whereby the additional weight is best disposed for being easily supported and without tending to unbalance the vehicle or to render the controlling thereof difficult.

The invention consists in a supplemental seat or saddle having appliances for the suspension thereof at its rear from the main saddle or saddle-support of the machine and at its front from the head of the machine; and in combination with the above the invention consists in other appliances, all substantially as will hereinafter more fully appear, and be set forth in the claims.

Referring to the accompanying drawings, in which an embodiment of the present invention is illustrated, Figure 1 is a perspective view of a part of a Safety bicycle, showing the supplemental seat applied thereon. Fig. 2 is an enlarged perspective view of a portion of the supplemental saddle and of its appliances, as seen at the under side of the saddle, the same being removed from the machine.

In the drawings, A represents a part of the frame of a Safety bicycle of which B is the head, and of which head the handle-bars B' are regarded as parts.

C represents the main or usual saddle for the machine, comprising or having provided therefor saddle-supporting parts, generally indicated by C'.

D represents the supplemental saddle or seat, which is to be made of any suitable material and in any suitable or practicable form, a form more or less as shown being a desirable one, and the saddle is preferably made of leather, and at its rear is provided with a metallic cantle *a*.

For the suspension of the saddle at its rear from the main saddle or saddle-support of the machine the straps *b b* are provided, which are riveted to the rear portion of the saddle D, the one strap being shorter than the other and having a buckle, and the longer strap is adapted for an engagement with the spring-coils or other loop-like or appropriate part of or for the main saddle.

There are straps *d d*, which by intermediate portions thereof are riveted to the under side of the saddle D at its front, so as to form the closed loops *f f*, more particularly seen in Fig. 2, and on one end of each strap there is a buckle *g*, the other end portion of the strap having a greater extent from the place of connection with the saddle than the buckle-carrying portion, and is adapted to be passed around the handle-bars next to the upright portion of the head and to be secured by said buckles *g*.

*h* represents a strap which is of loop form, the ends being closed and secured by the buckle *i*, and one bight thereof is adapted to engage the loops *f f* of the straps *d d* under the saddle, and the other bight thereof is adapted to embrace and engage one of the braces or members *j* of the main frame A. The said strap *h* is drawn taut, and, thus confined by the buckle *i*, serves as a stay for the supplemental saddle D to prevent undue lateral movements thereof.

*m m* represent straps which are in the form of extended loops, the terminals thereof being connected by the buckles *n n*. A bight of each loop-like strap has an engagement with the said loops *f f* of the straps *d d* under the saddle, and the bights at the bottoms of said straps constitute foot-rests. Leather foot-pieces *o o* or stirrups, more or less as shown in Fig. 1, may, if desired, be provided for the comfort of the child or second rider. Clearly the foot-rest straps may be lengthened or shortened for comfort or convenience, or they may be entirely removed, and the second rider, if his legs are long enough, may rest his feet on the usual coasting supports on the front fork-legs of the bicycle.

Of course it is not intended to limit the invention to the precise forms of engagement between the saddle and the various appliances provided for supporting and steadying the same and the foot-supports, but the forms and arrangements or combinations of the appliances with the saddle and with each other, substantially as shown, are efficient, cheap, durable, and desirable.

In the use of a saddle constructed and applied substantially as shown in Fig. 1 it is found that the weight of the person on the saddle D preponderates rearward, and is largely sustained by the support for the primary saddle, thus disposing the additional weight well toward the center of the machine, which obviously is advantageous, and, moreover, the suspension-saddle partakes of the spring effects of the support for the rear or main saddle.

Having thus described my invention, what I claim, and desire to secure by Letters Patent, is—

1. A supplemental seat or saddle for a bicycle, having at its rear a device for the support thereof from the main saddle or saddle-support of the machine and having at its front an appliance for suspending the saddle from the head of the machine, for the purpose set forth.

2. The combination, with the head of a bicycle and a saddle and support therefor to the rear of said head, of a supplemental seat or saddle having appliances at its rear for the support thereof from the main saddle or saddle-support of the machine and having appliances at the front thereof for its suspension from the head of the machine, for the purpose set forth.

3. A supplemental seat or saddle for a bicycle, having at its rear a device for the support thereof from the main saddle of the machine and having at its front an appliance for suspending the saddle from the head of the machine, and a stay device connected to the saddle and adapted to be engaged with the frame of the machine for preventing undue lateral movements of the supplemental saddle, substantially as set forth.

4. The combination, with the head of a bicycle and a saddle and support therefor to the rear of said head, of a supplemental seat or saddle having appliances at its rear for the support thereof from the main saddle or saddle-support and having appliances at the forward part thereof for its suspension from the head of the machine and also having suspended therefrom one or more foot-rests, substantially as set forth.

5. The combination, with the head of a bicycle and the saddle and support therefor, of a supplemental seat having appliances at its front and at its rear for the suspension thereof from the head and main saddle or saddle-support and having a stay device connected thereto and adapted to be engaged with the frame of the machine for preventing undue lateral movements of the supplemental saddle and also having suspended therefrom the foot-rests, substantially as set forth.

6. A supplemental seat or saddle for a bicycle, having at its rear portion the connected straps $b\ b$ and buckles, adapted to engage a part of the main saddle of the machine or its support, substantially as described, and having at its forward portion the straps $d\ d$, each by an intermediate portion united to the saddle, and one terminal of each of said straps having a buckle and the other end portion of each strap adapted to embrace the handle-bar carried at the head of the machine and to have a connection with the buckle, substantially as described.

7. A supplemental seat or saddle for a bicycle, having at its rear appliances for the support thereof from the main saddle or saddle-support of the machine and having at its forward portion the straps $d\ d$, each having its intermediate portion formed as a loop and secured to the saddle, and one terminal of each of said straps having a buckle and the other end portion of each strap adapted to embrace the handle-bar at the head of the machine and to have a connection with the buckle, and the pending straps engaged with said loops and each forming or carrying a foot-rest, substantially as described.

FRANK D. JONES.

Witnesses:
WM S. BELLOWS,
T. F. DINEEN.